(12) United States Patent
Kazo (10) Patent No.: US 6,636,911 B2
(45) Date of Patent: Oct. 21, 2003

(54) RECORDING MEDIA ADAPTOR DEVICE FOR IDENTIFYING TYPE OF RECORDING MEDIA BEFORE CONNECTING RECORDING MEDIA CONNECTION TERMINAL TO DEVICE CONNECTION TERMINAL

(75) Inventor: Kazuya Kazo, Kanagawa (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 09/836,058

(22) Filed: Apr. 17, 2001

(65) Prior Publication Data

US 2002/0004863 A1 Jan. 10, 2002

(30) Foreign Application Priority Data

Apr. 20, 2000 (JP) ........................ 2000-126262

(51) Int. Cl.[7] ............................ G06F 13/10; G06F 13/14
(52) U.S. Cl. ............................ 710/62; 710/8; 710/13; 710/64

(58) Field of Search ............................ 710/8, 13, 62, 710/64

(56) References Cited

U.S. PATENT DOCUMENTS 5,049,937 A * 9/1991 Takeda ........................ 399/45
5,926,506 A * 7/1999 Berthold et al. ............ 375/222

FOREIGN PATENT DOCUMENTS

JP        401068057 A  *  3/1989  .......... H04M/11/00

* cited by examiner

Primary Examiner—Rehana Perveen
(74) Attorney, Agent, or Firm—Jay H. Maioli (57) ABSTRACT

The present invention has an object of determining the type of a recording medium before it is attached and electrically connected to a device to access data in recording media respectively having different shapes, so that information necessary to access the recording medium to be attached can be prepared in advance.

12 Claims, 12 Drawing Sheets

RECORDING MEDIA ADAPTOR DEVICE FOR IDENTIFYING TYPE OF RECORDING MEDIA BEFORE CONNECTING RECORDING MEDIA CONNECTION TERMINAL TO DEVICE CONNECTION TERMINAL

BACKGROUND OF THE INVENTION

1. Field of the Invention

The present invention relates to a method in which recording media which respectively have electric characteristics different from each other are attached to an apparatus and the types of the media are distinguished before the media are electrically connected, and the apparatus.

2. Prior Art

Recording/reproducing apparatuses for a digital still camera, a digital audio data recording/reproducing apparatus, a notebook computer, and the like have conventionally been known.

This kind of recording and/or reproducing apparatus uses a storage medium having a memory where various information such as image data, audio data, and the like, e.g., a memory card. With respect to the memory card, various standards such as a PC card type memory card, a compact flash card (TM), a smart medium (TM), a memory stick (TM), a multi-media card (TM), a SD card (TM), and the like have been proposed and put into practice. The storage element is not limited to a semiconductor memory but may be one which includes a small disc, maintaining an outer shape and above-described electric characteristics which are defined according to corresponding standards. There are plural kinds of specifications for the storage media, which are matched with the various kinds of recording and/or reproducing apparatuses, as described above. The storage media which thus have different specifications have also shapes different from each other, and the positions where terminal parts for signal input/output, which are electrically connected to recording and/or reproducing apparatuses, are different from each other.

For example, many digital still cameras as recording and/or reproducing apparatuses can use only one kind of storage medium and are not allowed to use another kind of storage medium.

A notebook computer as a recording and/or reproducing apparatus has a card slot where various electric devices such as a memory, modems, and the like can be attached as a PC card having a card-like shape. To use a storage medium as described above, the notebook PC uses an adaptor device to which a storage medium is attached, and the storage medium is attached to a card slot through the adaptor device. Thus, information can be recorded/reproduced with respect to a storage medium.

Meanwhile, the type of a storage medium as a target on and/or from which information is recorded and/or reproduced can be identified only by transferring/receiving electric signals by the recording and/or reproducing apparatus.

That is, a conventional adaptor device is asked of the type of an attached storage medium by a signal outputted from a recording and/or reproducing apparatus when the conventional adaptor device is attached to an adaptor attachment part of the recording and/or reproducing device.

In the recording and/or reproducing apparatus, various information such as the type of a storage medium attached to the adaptor device, storage capacity, driving voltage, and the like is obtained by input/output of signals through the terminal part for signal input/output of the storage medium. The recording and/or reproducing apparatus identifies the type of the storage medium attached to the adaptor device by obtaining various information based on a signal outputted from the adaptor device.

Therefore, with respect to a conventional adaptor device, the type of the storage medium can be identified only by electric signals after the recording and/or reproducing apparatus is electrically connected to a storage medium, in case where the recording and/or reproducing apparatus identifies the type of a storage medium attached to the adaptor device.

Therefore, the conventional adaptor device has a problem in that a predetermined time is required to identify the type of an attached storage medium after the adaptor device is attached to the recording and/or reproducing apparatus. That is, the recording and/or reproducing apparatus has a drawback that a predetermined time is required to make processing for recording and/or reproducing information with respect to a storage medium.

BRIEF SUMMARY OF THE INVENTION

The present invention has an object of providing an adaptor device to which recording media respectively having different shapes are attached and which is attached to an input/output device for performing input/output of a signal to/from the recording media, comprising: attachment means to which the recording media are attached; medium-side connection means electrically connected to terminal parts for signal input/output of the recording media; device-side connection means electrically connected to a terminal part for signal input/output of the input/output device; and medium identification means by which the input/output device identifies a type of every one of the recording media attached to the attachment means, before the terminal part for signal input/output of the signal input/output device is electrically connected to the device-side connection means.

Also, the present invention has another object of providing an input/output device to which recording media respectively having different shapes are attached and which has an adaptor device including a medium-side connection part electrically connected to a terminal part of every one of the recording media for signal input/output, a device-side connection part electrically connected to a terminal part for signal input/output of the input/output device, and a medium identification part for indicating a type of every one of the recording media attached, comprising: connection means electrically connected to the device-side connection part included in the adaptor device, thereby to perform input/output of a signal to/from the recording media; and determination means for determining a type of the recording media attached to the adaptor device, from a medium identification part provided on the adaptor device, before the device-side connection part and the connection means are connected.

Also, the present invention has further another object of providing an input/output device to which a plurality of recording media respectively having different shapes are attached and which performs input/output of a signal to/from the recording media, comprising: tray means having a plurality of attachment parts provided such that the attachment parts to which the plurality of recording media respectively having different shapes share partially attachment regions of their own in common in one same projection plane on which the attachment regions are projected while having different attachment positions in the depth direction parallel to the thickness direction of the recording media to be attached; a plurality of medium-side connection means respectively provided for the attachment parts and electrically connected to terminal parts for signal input/output of the plurality of recording media respectively having different shapes; drive means for accessing the recording media through the medium-side connection means; and medium detection means for detecting types of the recording media respectively attached to the attachment parts of the tray means, before the drive means accesses the recording media.

In the adaptor device according to the present invention, the type of a storage medium can be identified rapidly when it is attached to a recording and/or reproducing apparatus. It is therefore possible to shorten the time required for processing of recording and/or reproducing information with respect to the storage medium.

Also, in the recording/reproducing apparatus according to the present invention, the type of a storage medium attached to an adaptor device can be rapidly identified, so that the time required for processing of recording and/or reproducing information with respect to the storage medium can be shortened.

Also, in the recording and/or reproducing apparatus according to the present invention, the type of a storage medium attached to a tray can be identified rapidly, so that the time required for processing of recording and/or reproducing information with respect to the storage medium can be shortened.

DETAILED DESCRIPTION OF THE INVENTION

With respect to embodiments of the present invention, an adaptor device and a recording/reproducing apparatus will now be explained with reference to the drawings.

The adaptor device according to the present invention is formed to have outer dimensions which comply with the PC (Personal Computer) card standard and can be attached to a card slot of a notebook computer.

Figure 1:
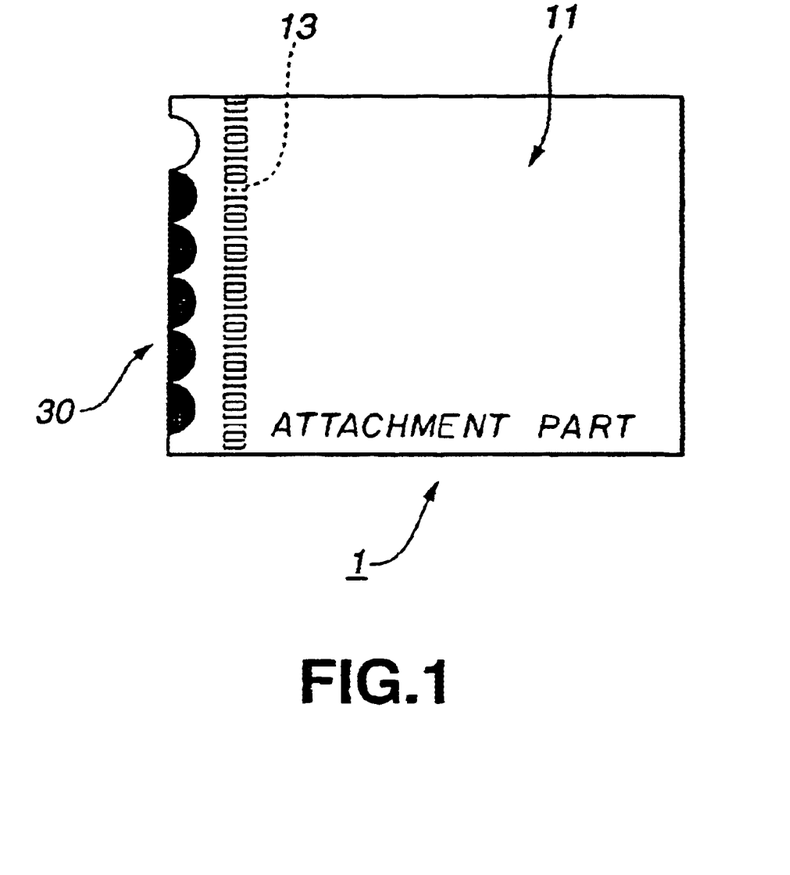
FIG. 1 is a plan view showing an adaptor device according to the present invention.
Figure 2:
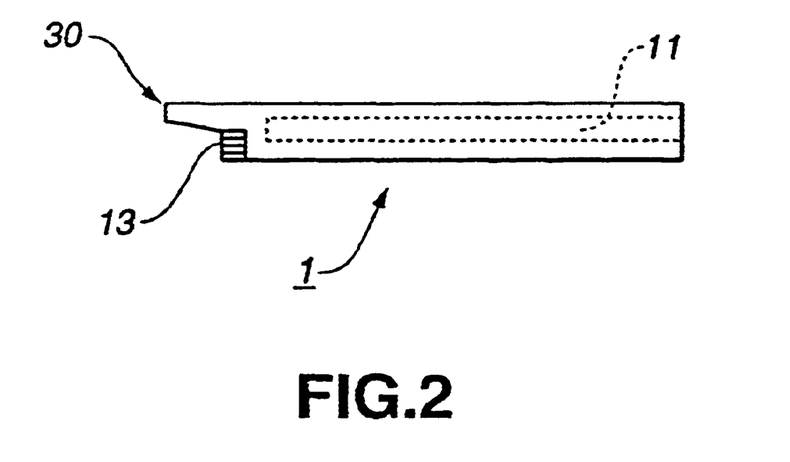
FIG. 2 is a side view showing the adaptor device.

As shown in FIGS. 1 and 2, the adaptor device 1 comprises an attachment part 11 to which a storage medium 2 is attached, a medium-side connection terminal 12 which is electrically connected with a terminal part for input/output of signals for a storage medium attached to this attachment part 11, and a device-side connection terminal 13 which is electrically connected with a recording/reproducing apparatus of, for example, a digital still camera, a notebook computer, or the like.

Figure 5:
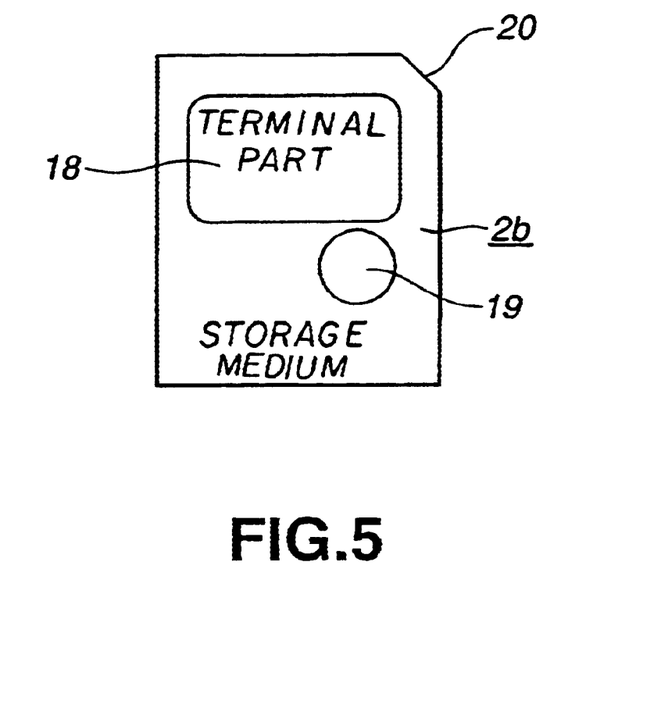
FIG. 5 is a plan view for explaining a second storage medium attached to the adaptor device.
Figure 6:
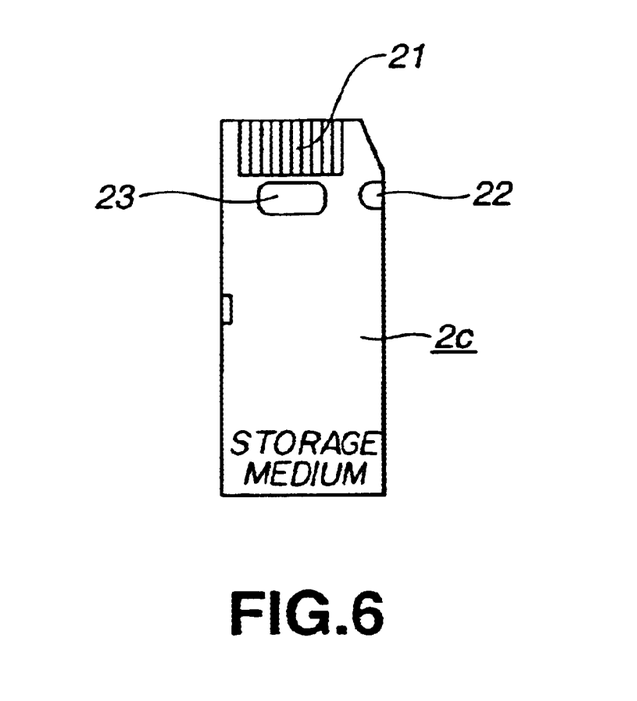
FIG. 6 is a plan view for explaining a third storage medium attached to the adaptor device.

The storage medium 2 which is attached to the adaptor device 1 is, for example, a compact flash memory (Compact Flash: trademark, hereinafter called a first storage medium) as a first recording medium 2a, FIGS. 3 and 4. As shown in FIG. 5, Smart Media (trademark, hereinafter called a second storage medium) is used as a second storage medium 2b. As shown in FIG. 6, a so-called memory card such as Memory Stick (trademark, hereinafter called a third storage medium) or the like. Of course, it is possible to apply Multi Media Card (trademark) whose specification differs from those of first, second, and third storage media 2a, 2b, and 2c, other storage media that include a small recording disc as a storage element while maintaining a shape and electric characteristics defined by standards of respective memory cards, without being limited to a semiconductor memory, or the like.

At first, these first, second, and third storage media 2a, 2b, and 2c will be explained with reference to the drawings.

Figure 3:
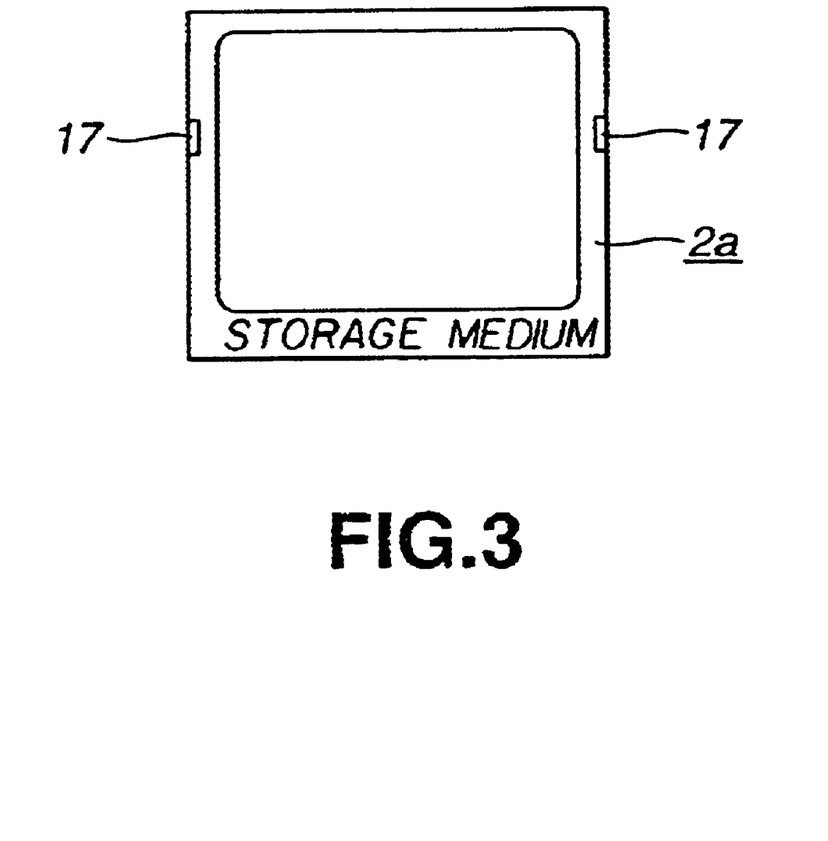
FIG. 3 is a plan view for explaining a first storage medium attached to the adaptor device.
Figure 4:
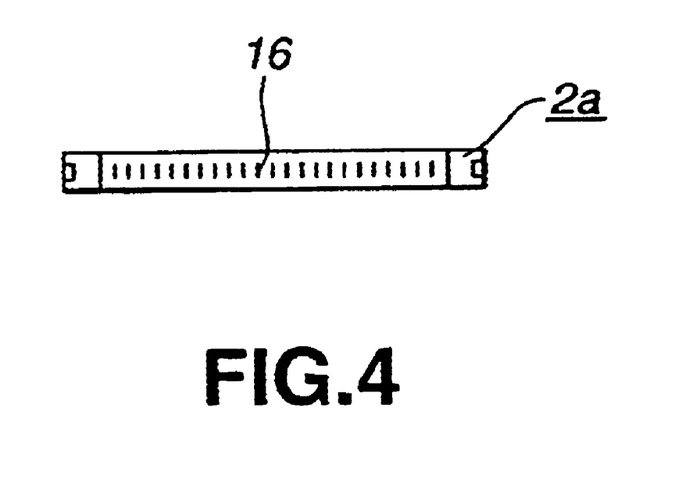
FIG. 4 is a side view for explaining the first storage medium.

The first storage medium 2a is formed into a substantially plate-like shape, as shown in FIGS. 3 and 4. A terminal part 16 for input/output of signals, which is connected electrically with a medium-side connection terminal 12, is provided at one-side surface part perpendicular to a main surface. Also, as shown in FIGS. 3 and 4, identification grooves 17 for identifying the specification type are formed respectively on both side surfaces in the width direction, in the first storage medium 2a.

The second storage medium 2b is formed into a substantially plate-like shape, as shown in FIG. 5, and has a smaller width compared with the first storage medium 2a. In the second storage medium 2b, a terminal part 18 for input/output of signals, which is connected electrically with the medium-side connection terminal 12 of the adaptor device 1 is provided and positioned at the substantial center on the bottom surface facing the main surface, as shown in FIG. 5. In addition, in the second storage medium 2b, an error-recording prevention part 19 for preventing recorded information from being overwritten and erased by erroneously recording information thereon is provided near the center on the bottom surface. Further, two types of specification are prepared for the second storage medium 2b, and an identification notch part 20 for identifying the type of its driving voltage is formed at any one of corner parts in the front end side in the insertion/desertion direction with respect to the recording/reproducing apparatus.

The third storage medium 2c is formed into a substantially plate-like rubber shape, as shown in FIG. 6, and its width is set to be smaller compared with the storage medium 2b. As shown in FIG. 6, in the third storage medium 2c, the terminal part 21 for input/output of signals, which is electrically connected with the medium-side connection terminal of the adaptor device 1c shown in FIG. 9B, is provided and positioned on the bottom surface of a corner part in the insertion end side. In addition, in the third storage medium 2c, an identification concave part 22 for identifying the type of specification is provided on the bottom surface in the side of one side surface in the lengthwise direction. Also, in the third storage medium 2c, an error-recording prevention part 23 for preventing recorded information from being overwritten and erased by erroneously recording information is provided and positioned in the front end side on the bottom surface.

Further, as shown in FIGS. 1 and 2, the adaptor device 1 is provided with a medium identification part 30 for identifying the type of the storage medium attached to the attachment part 11, which is positioned in the front end side in the insertion/desertion direction with respect to the adaptor attachment part in the side of the recording/reproducing apparatus. This medium identification part 30 has a plurality of concave parts, as shown in FIG. 1.

The adaptor device 1 is formed such that the combination of presence/absence of the plurality of concave parts of the medium identification part 30 differ, corresponding to the type of the storage medium 2 attached to the attachment part 11. The medium identification part 30 is formed such that arrangements of presence/absence of the plurality of concave parts respectively differ in correspondence with the first, second, and third storage media 2a, 2b, and 2c.

Figure 7:
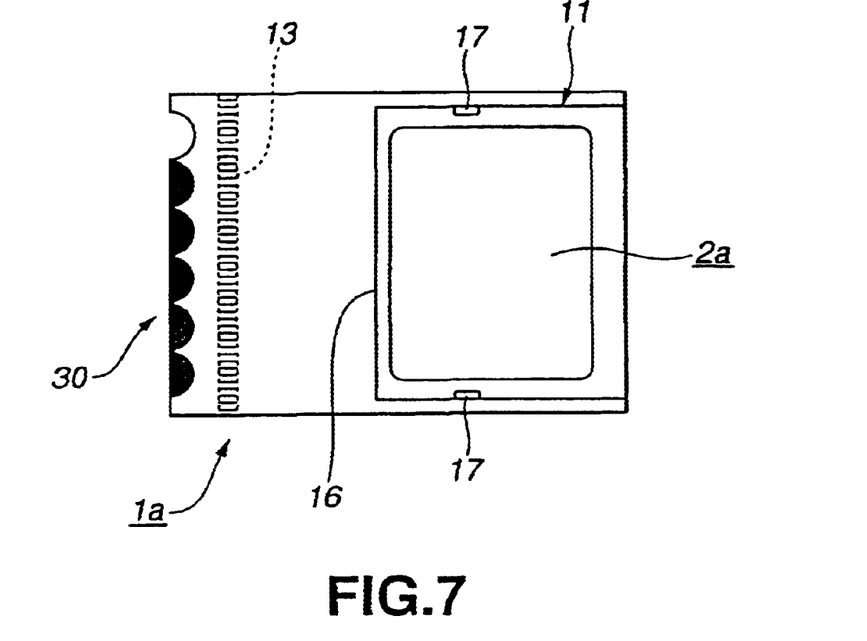
FIG. 7 is a plan view showing a first adaptor device to which the first storage medium is attached.
Figure 8:
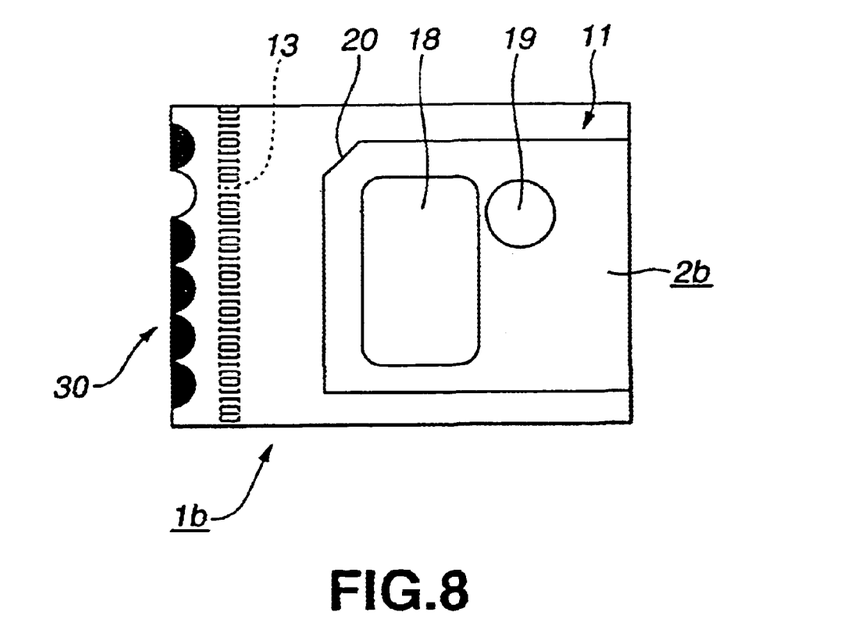
FIG. 8 is a plan view showing a second adaptor device to which the second storage medium is attached.
Figure 9A:
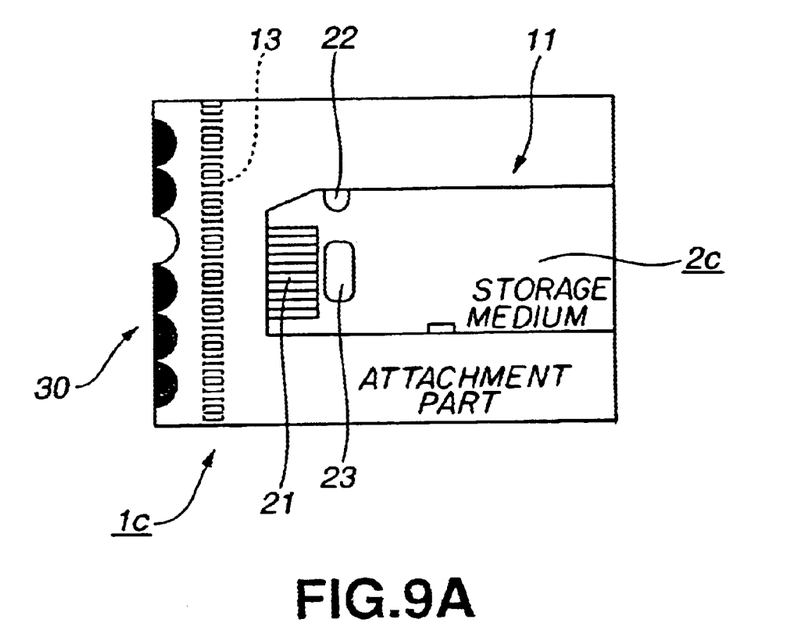
FIGS. 9A and 9B are plan views showing a third adaptor device to which the third storage medium is attached.
Figure 9B:
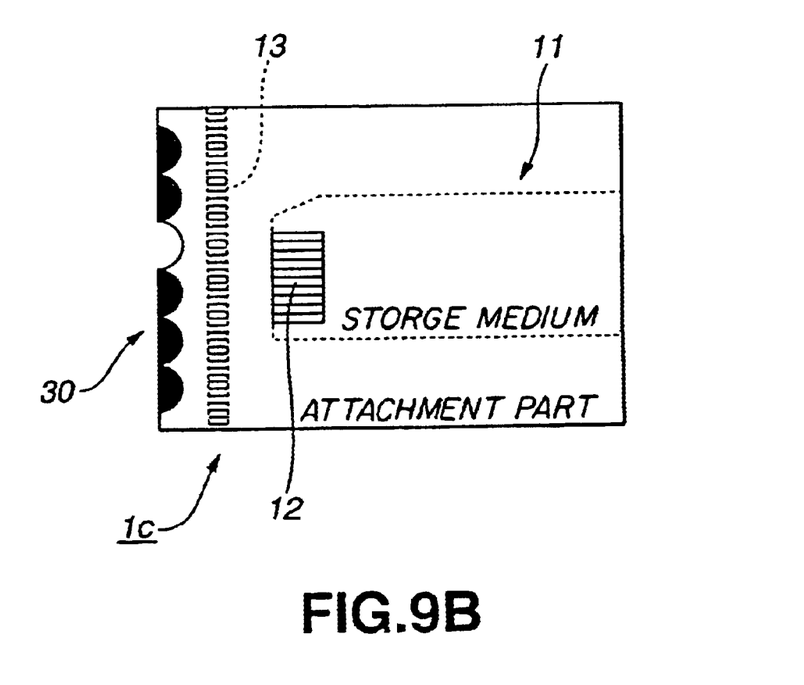

Therefore, with respect to the adaptor device 1, dedicated first, second, and third adaptor devices 1a, 1b, and 1c are respectively prepared in correspondence with the first, second, and third storage media 2a, 2b, and 2c, as shown in FIGS. 7, 8, and 9A.

That is, for example, if the medium identification part 30 is identified by presence/absence of six concave parts as shown in FIGS. 7, 8, and 9A, it is possible to identify six types of storage media 2 where it is simplified. However, two ways of presence and absence of a concave part can be combined at each of six parts, so that $2^6=64$ combinations are available. It is thus possible to identify 64 types of recording media.

Next, the recording/reproducing apparatus comprising an adaptor device part to which the adaptor device 1 is attached comprises detection parts 37a, 37b, 37c, 37d, 37e, and 37f which detect the medium identification part 30 of the adaptor device 1. This detection part has a switch which is operated, depending on presence or absence of concave parts of the medium identification part 30, and the detection parts 37a, 37b, 37c, 37d, 37e, and 37f are provided at a position corresponding to the medium identification part 30 of the adaptor device attached to the adaptor attachment part, such that the medium can be identified when the medium identification part 30 is detected by the adaptor end part detection part 36.

Figure 10:
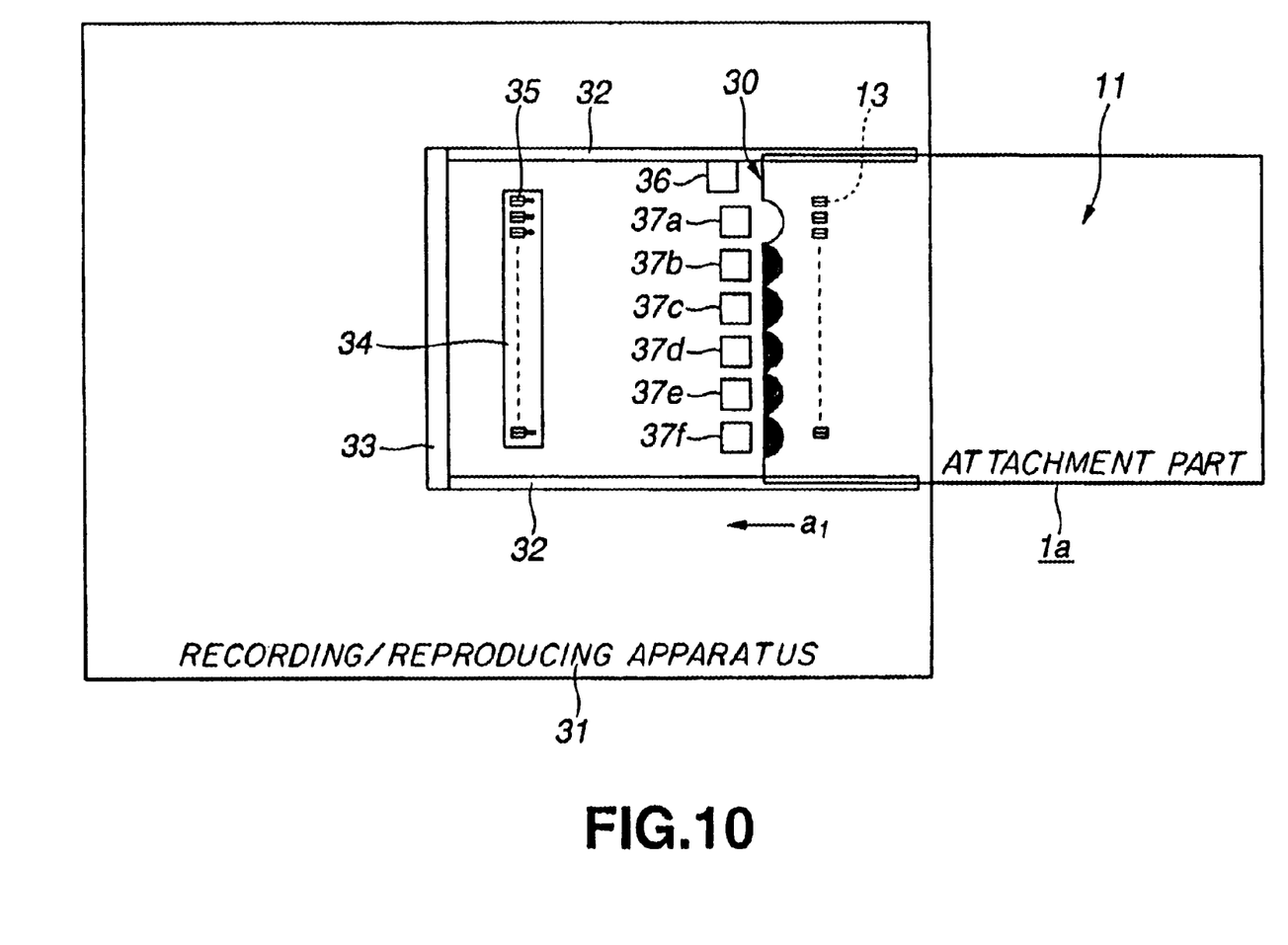
FIG. 10 is a first view showing a state in which the adaptor device is attached to a reproducing apparatus.
Figure 11:
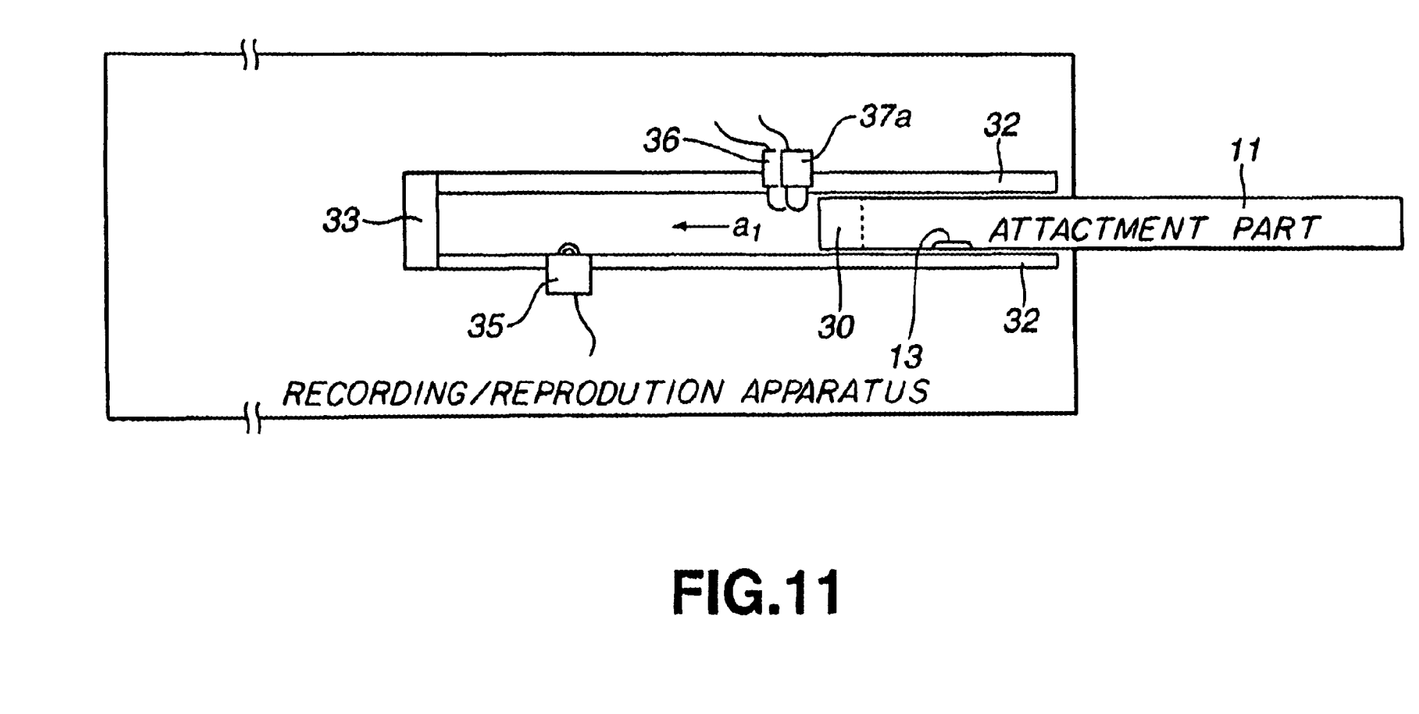
FIG. 11 is a second view showing a state in which the adaptor device is attached to a reproducing apparatus.

With respect to the adaptor device 1 constructed as described above, operation of detecting presence/absence of concave parts of the medium identification part 30, when the device 1 is attached to the recording/reproducing device, and of identifying the type of the storage medium 2 will be explained with reference to FIGS. 10 and 11.

When the adaptor device 1 is attached to the adaptor attachment part of the recording/reproducing apparatus 31, the position of the medium identification part 30 is detected by the adaptor end part detection part 36 of the recording/reproducing apparatus, and thereafter, the combination of presence/absence of concave parts of the medium identification part 30 is detected, so that the type of the storage medium is identified.

That is, when this adaptor device 1 is attached to the recording/reproducing apparatus 31, it is capable of rapidly identifying mechanically or optically the storage medium 2 attached to the attachment part 11, depending on presence/absence of concave parts of the medium identification part 30, before identifying the type of the storage medium 2 by transferring/receiving electric signals, through the medium-side connection terminal 12 connected to a terminal part 16, 21, or the like for input/output of signals of the storage medium 2 attached to the attachment part 11.

In addition, the adaptor device 1 constructed as described above has an adaptor attachment part to which the first, second or third adaptor device 1a, 1b, or 1c is attached. The adaptor attachment part is provided with a detection part for detecting the medium identification part 30 of an adaptor device 1a, 1b, or 1c to be attached. This detection part has a plurality of switches 37a, 37b, 37c, 37d, 37e, and 37f for mechanically detecting the medium identification part 30, and is operated so that presence/absence of each concave part is detected when the adaptor end part detection part 36 detects the medium identification part 30 of an adaptor. In this manner, the type of the storage medium 2 corresponding to a combination of presence/absence of concave parts is identified.

The medium identification part 30 which the adaptor device 1 comprises is constructed such that the combination of presence/absence of concave parts differs depending on the type of the storage medium 2. However, the part 30 may be constructed so as to include an optical member whose reflection rate differs depending on the type of the storage medium 2.

The detection part which detects this kind of medium identification part comprises an optical element including a light source for illuminating the optical member with light, and a light receiving part for receiving reflection light from the optical member, to detect optically the reflection rate of the optical member although not shown in the figures. As a result of this, it is possible to identify the type of the storage medium 2 corresponding to the reflection rate of the optical member.

Figure 12:
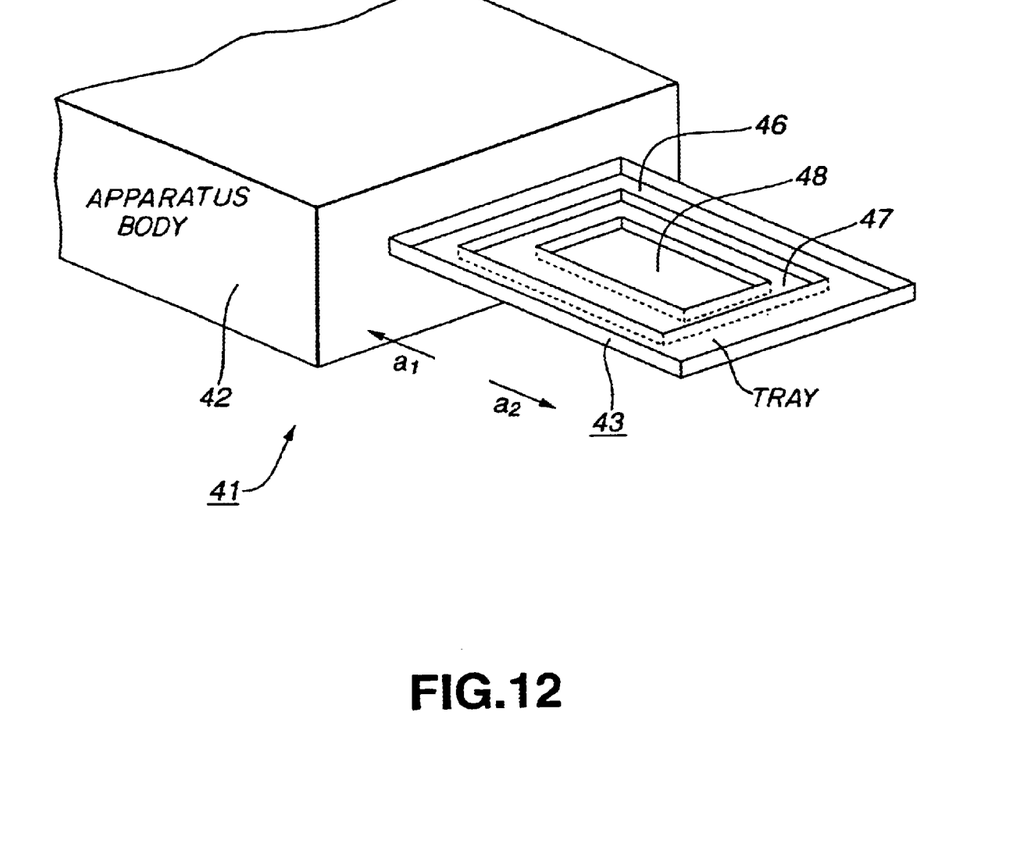
FIG. 12 is a perspective view showing a tray comprised in another recording/reproducing apparatus.
Figure 13:
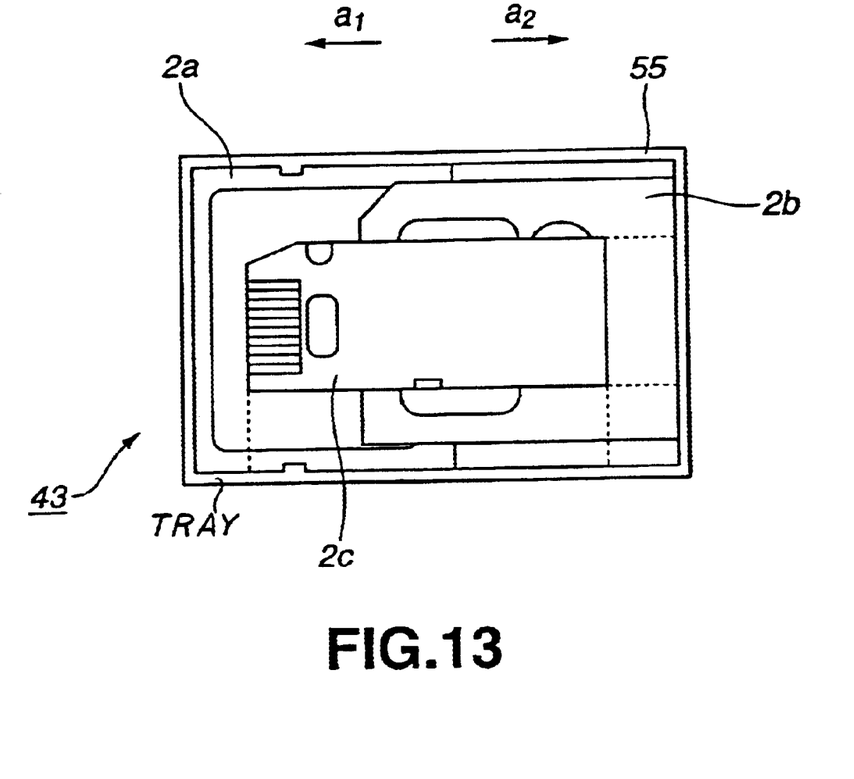
FIG. 13 is a plan view for explaining first, second, and third attachment parts included in the tray.

Also, as shown in FIG. 12, another recording/reproducing apparatus 41 according to the present invention is applied to, for example, a notebook computer, and comprises an apparatus body 42 for recording/reproducing information with respect to a storage medium 2, and a tray 43 which is provided to be movable on the apparatus body 42 and to which first, second, and third storage media 2a, 2b, and 2c having specifications different from each other are attached.

The apparatus body 42 has a recording/reproducing part for recording/reproducing information with respect to the first, second, and third storage media 2a, 2b, and 2c.

The tray 43 is provided to be movable in the arrow directions a1 and a2 in relation to the apparatus body 42, and is slidable to a containing position where it is contained in the apparatus body 42 and a discharge position where it is discharged from the apparatus body 42. Accordingly, the tray 43 need not have a device-side connection terminal connected electrically to the apparatus body 42.

As shown in FIGS. 3 and 4 described above, for example, a compact flash memory is adopted as the first storage medium 2a attached to the tray 43. As shown in FIG. 5, for example, smart media is used as the second storage medium 2b. As shown in FIG. 6, for example, a memory stick is used as the third storage medium 2c. Note that another storage medium such as a multimedia card and the like which has a different specification from the first, second, and third storage media 2a, 2b, and 2c may be adopted, of course.

The first, second, and third storage media 2a, 2b, and 2c have respectively different outer dimensions and terminal parts 16, 18, and 21 for input/output of signals which are respectively provided at different positions, as shown FIGS. 3, 4, 5, and 6. Therefore, the tray 43 is provided with first, second, and third attachment parts 46, 47, and 48 corresponding respectively to the storage media 2a, 2b, and 2c. As shown in FIGS. 12, 13, 14, and 15, the tray 43 has the first, second, and third attachment parts 46, 47, and 48 where the first, second, and third storage media 2a, 2b, and 2c having different specifications from each other are set and attached, and first, second, and third medium-side connection terminals 51, 52, and 53 which are electrically connected with terminal parts 16, 18, and 21 for input/output of signals of the first, second, and third storage media 2a, 2b, and 2c.

Figure 14:
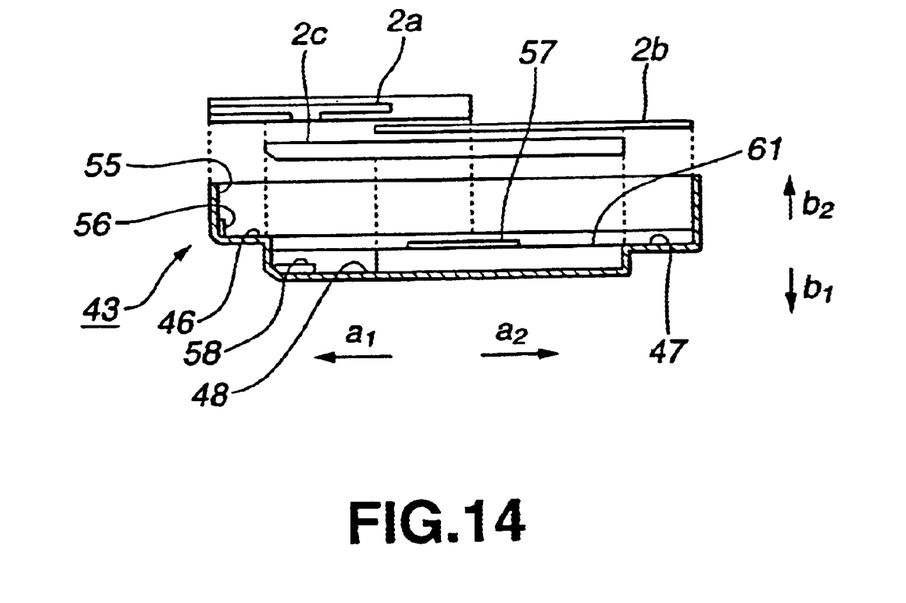
FIG. 14 is a longitudinal cross-sectional view for explaining first, second, and third attachment parts included in the tray.
Figure 15:
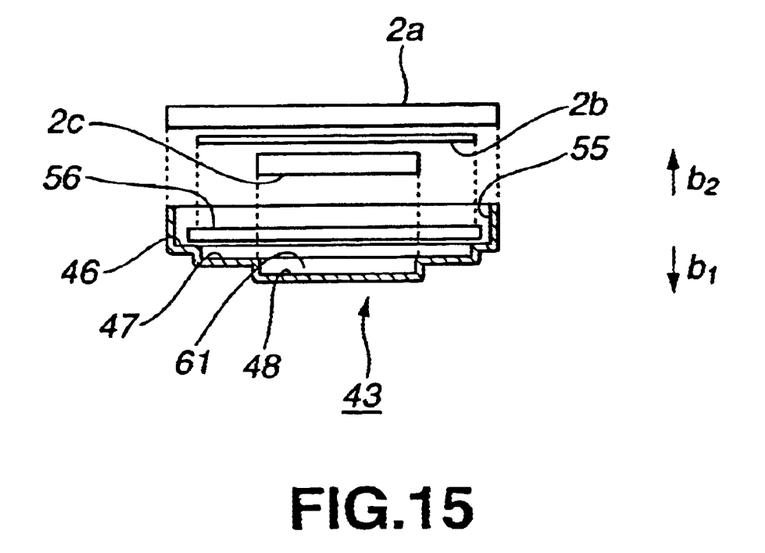
FIG. 15 is a lateral cross-sectional view for explaining first, second, and third attachment parts included in the tray.

As shown in FIGS. 12, 14, and 15, the tray 43 is formed into a substantially rectangular shape and has an opening part 55 through which the first, second, and third storage media 2a, 2b, and 2c are inserted and deserted in and from the first, second, and third attachment parts 46, 47, and 48. In the tray 43, the first, second, and third attachment parts 46, 47, and 48 are formed to have different attachment positions in the depth direction as the thickness direction of the tray 43.

The first, second, and third attachment parts 46, 47, and 48 are formed such that the depths of the storage media 2 to be attached are slightly larger than the thicknesses of the storage medium 2 to be attached, in correspondence with the thicknesses of the first, second, and third storage media 2a, 2b, and 2c.

The first attachment part 46 is provided adjacent to the opening part for insertion/desertion, at a position in the side of the side surface which faces the apparatus body. Also, in the first attachment part 46, a first medium-side connection terminal part 56 which is electrically connected with the terminal part 16 for input/output of signals of the first storage medium 2a is provided in the side surface facing the apparatus body 42, as shown in FIGS. 14 and 15.

The second attachment part 47 is provided adjacent to the first attachment part 46, at a position in the rear end side in the movement direction in relation to the apparatus body 42 and is formed in a step-like shape having a smaller width compared with the width of the first attachment part 46, in correspondence with the width of the second storage medium 2b. In addition, as shown in FIG. 14, a second medium-side connection terminal part 57 electrically connected with the terminal part 18 for input/output of signals of the second storage medium 2b is provided at a position of the second storage medium 2b, facing the bottom surface of the second storage medium 2b to be attached.

The third attachment part 48 is provided and positioned adjacent to the second attachment part 47, and is formed in a step-like shape having a smaller width compared with the second attachment part 47, in correspondence with the width of the third storage medium 2c. In addition, as shown in FIG. 14, the third medium-side connection terminal 58 electrically connected with the terminal part 21 for input/output of signals of the third storage medium 2c, at a position opposed to the bottom surface of the third storage medium 2c to be attached.

Figure 16:
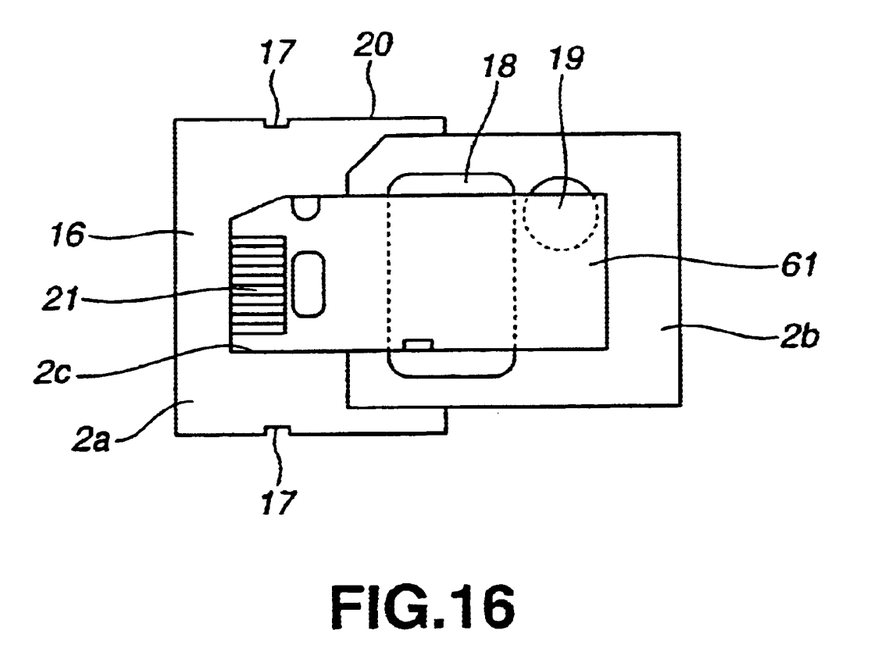
FIG. 16 is a plan view for explaining respective attachment regions of the first, second, and third attachment parts.

Further, as shown in FIG. 16, the first, second, and third attachment parts 46, 47, and 48 are respectively provided at positions where the respective attachment regions partially share each other in one same projection plane in which the attachment regions are projected, thereby realizing miniaturization of the tray 43.

Although not shown, the first, second, and third attachment parts 48 are respectively provided with detection parts for detecting attachment of the first, second, and third storage media 2a, 2b, and 2c of the first, second, and third attachment parts 48. These detection parts each have a switch which is pushed in and operates. Which of the first, second, and third storage media 2a, 2b, and 2c is attached is identified by detecting the identification grooves 17 of the first storage medium 2a, the bottom surface in the vicinity of each rear corner part of the second storage medium 2b, and the identification concave part 22 of the third storage medium 2c.

Also, as shown in FIGS. 14, 15, and 16, the third attachment part 48 is provided with an elastic support member 61 which supports the second storage medium 2b attached to the second attachment part 47 and is pushed and operates by the third storage medium 2c attached to the third attachment part 48. A second medium-side connection terminal 58 connected with the terminal part 21 for input/output of signals is provided on this elastic support member 61.

This elastic support member 61 can be elastically shifted in the directions of arrows b1 and b2 as the thickness direction of the third storage medium attached to the third attachment part 48. The member 61 contacts and supports the bottom surface of the second storage medium 2b when the second storage medium 2b is attached to the second attachment part 47, and is compressed when the third storage medium 2c is attached to the third attachment part 48.

With respect to the recording/reproducing apparatus 41 constructed as described above, explanation will be made of a state in which the first, second, and third storage media 2a, 2b, and 2c are respectively attached to the first, second, and third attachment parts 46, 47, and 48 of the tray 43, with reference to the drawings.

Figure 17:
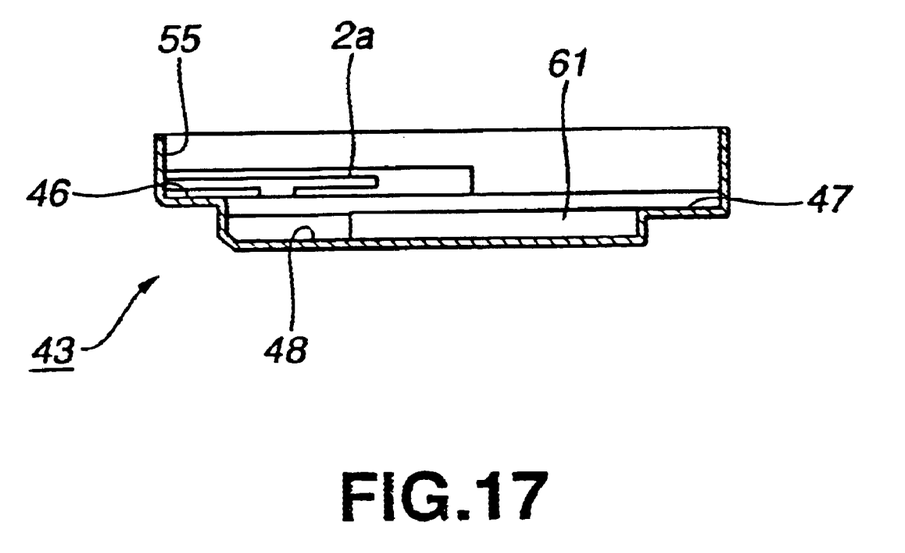
FIG. 17 is a longitudinal cross-sectional view showing a state in which the first storage medium is attached to the first attachment part.

At first, in case where the first storage medium 2a is attached to the first attachment part 46, the terminal part 16 for input/output of signals of the first storage medium 2a is electrically connected to the first medium-side connection terminal 56 as the tray 43 is moved in the direction of the arrow a1 as a direction parallel to the main surface of the first storage medium 2a.

When the first storage medium 2a is attached to the first attachment part 46, for example, engagement members of a drawing mechanism not shown are engaged in the identification grooves 17 and moved in the direction of the arrow a1, so that the first storage medium 2a is attached to a predetermined attachment position. When the first storage medium 2a is attached to the first attachment part 46, the identification grooves 17 are detected by the detection part and the type of the first storage medium 2a is thereby identified, before information concerning the type of the storage medium 2 is identified as the terminal part 16 for input/output of signals is connected to the medium-side connection terminal 56 so that signals are transferred and received.

Figure 18:
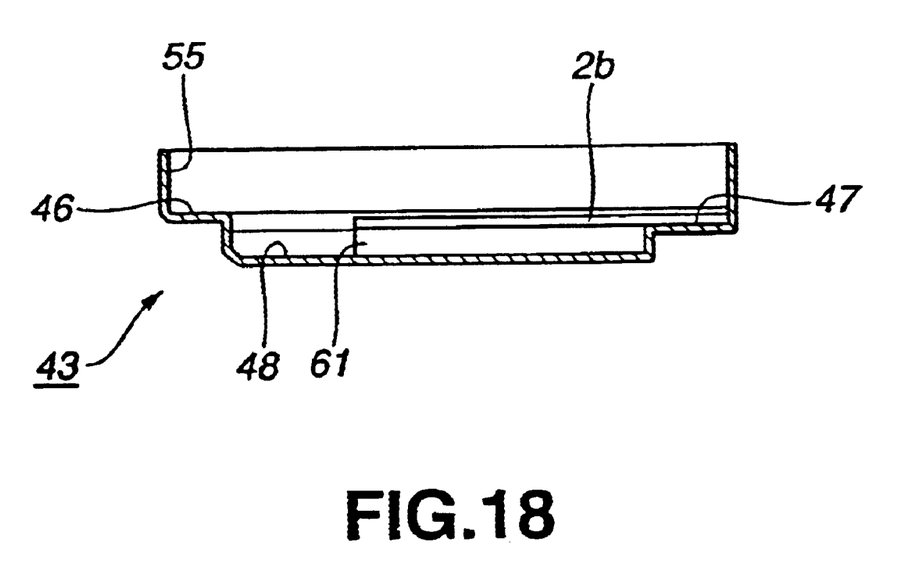
FIG. 18 is a longitudinal cross-sectional view showing a state in which the second storage medium is attached to the second attachment part.

Next, in case where the second storage medium 2b is attached, as shown in FIG. 18, the terminal part 18 for input/output of signals of the second storage medium 2b is electrically connected to the second medium-side connection terminal of the second attachment part 47 and the second storage medium 2b is thus set in the second attachment part 47. When the second storage medium 2b is attached to the second attachment part 47, the bottom surface of each corner part in the rear end side in relation to the recording/reproducing apparatus is detected as an identification part for identifying the type of specification by the detection part, and the type of the specification of the second storage medium 2b is thereby identified, before the terminal part 18 for input/output of signals is connected to the medium-side connection terminal 57 so that signals are transferred/received, thereby to identify information concerning the type of the storage medium 2.

Figure 19:
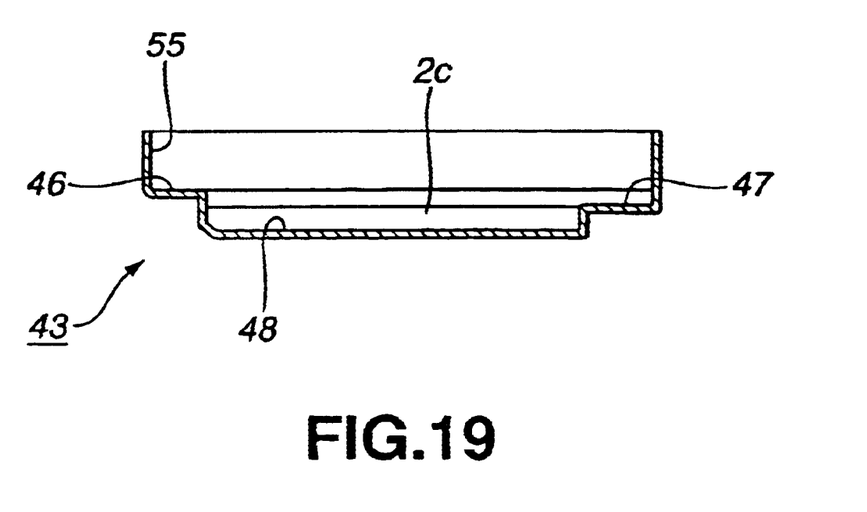
FIG. 19 is a longitudinal cross-sectional view showing a state in which the third storage medium is attached to the third attachment part.

Likewise, in case where the third storage medium 2c is attached as shown in FIG. 19, the terminal part 21 for input/output of signals of the third storage medium 2c is electrically connected with the third medium-side connection terminal 58 and is set in the third attachment part 48. When the third storage medium 2c is attached to the third attachment part 48, identification concave parts 22 are detected by the detection part and the type of the third storage medium 2c is thereby identified, before the terminal part 21 for input/output of signals is connected with the third medium-side connection terminal 58 so that signals are transferred/received, thereby to identify information concerning the type of the storage medium 2.

Figure 20:
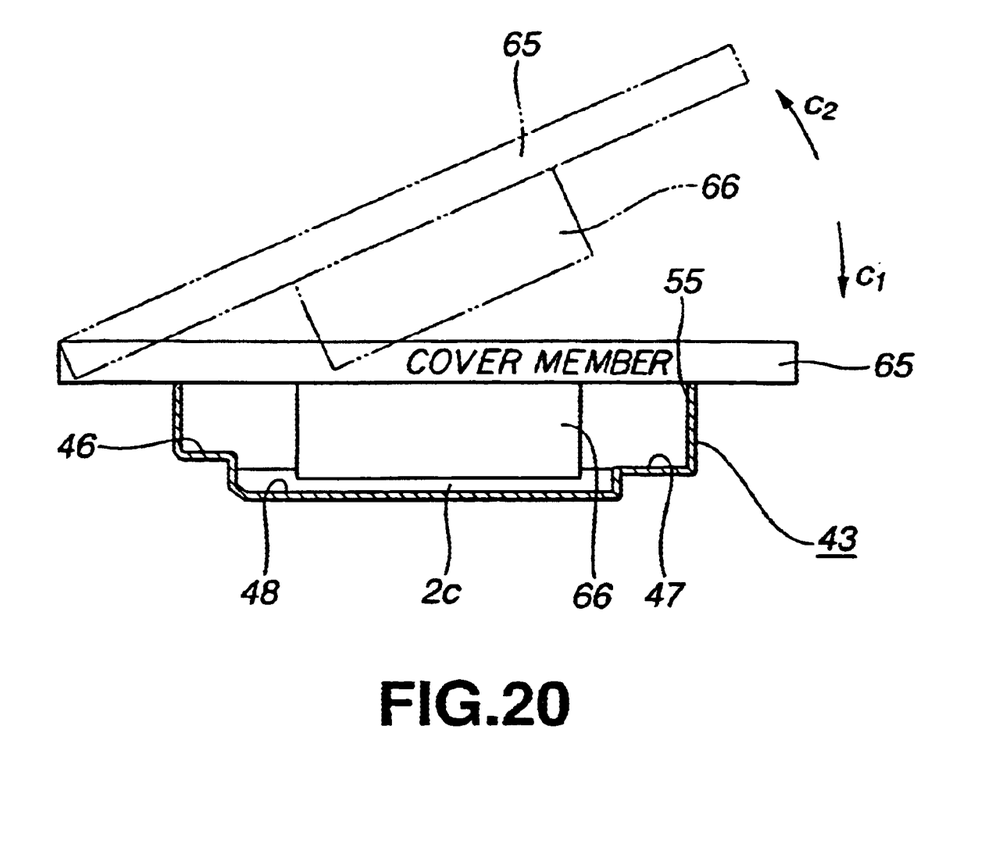
FIG. 20 is a longitudinal cross-sectional view for explaining a cover member provided for the tray.

Also, the tray 43 may be constructed so as to comprise a cover member 65 provided to be openable/closable with respect to the opening part 55 for insertion/desertion, as shown in FIG. 20.

As shown in FIG. 20, the cover member 65 is formed in a size large enough to close the opening part 55 used for insertion/desertion, and is arranged to be rotatable in the directions of the arrow c1 and c2 with respect to the opening part 55 for insertion/desertion of the tray 43. The cover member 65 is provided with a press member 66 on the inner surface opposed to the third attachment part 48, which presses the third storage medium 2c against the third attachment part 48. The press member 66 is formed of an elastic material such as rubber or the like which has a predetermined elasticity. Further, when the cover member 65 closes the tray 43, the press member 66 presses the third storage medium 2c against the third attachment part 48 with a predetermined pressing force, and thus, the terminal part 21 for input/output of signals can be steadily connected with the third medium-side connection terminal 58.

Although the tray 43 comprised in the recording/reproducing apparatus described above is constructed such that each of the first, second, and third storage media 2a, 2b, and 2c can be attached, it may be constructed so as to comprise another attachment part and another medium-side connection terminal which correspond to another storage medium, of course.

As described above, when the first, second, and third storage media 2a, 2b, and 2c are attached to the first, second, and third attachment parts 46, 47, and 48 of the recording/reproducing apparatus 41, the type of the storage media 2 can be identified by the detection parts provided for the attachment parts 46, 47, and 48. Therefore, the time required for recording/reproducing operation with respect to the storage media 2 can be shortened.

Also, according to the recording/reproducing apparatus 41, plural kinds of first, second, and third storage media 2a, 2b, and 2c can respectively be attached. Therefore, it is possible to attach easily the first, second, and third storage media 2a, 2b, and 2c without preparing plural kinds of adaptor devices.

Also, since the recording/reproducing apparatus 41 comprises a tray 43 having first, second, and third attachment parts 46, 47, and 48 to which first, second, and third storage media 2a, 2b, and 2c are respectively attached, the terminal parts 16, 18, and 21 for input/output of signals of the storage media 2a, 2b, and 2c are electrically connected with the medium-side connection terminals 56, 57, and 58, when the storage media 2a, 2b, and 2c are respectively attached to the attachment parts 46, 47, and 48. Thus, the storage media 2a, 2b, and 2c are not connected through any device-side connection terminal. Accordingly, wiring parts can be reduced more compared with a conventional adaptor device, so that occurrence of electric connection errors is suppressed and the reliability of recording/reproducing operation can be improved.

Although the tray 43 comprised in the recording/reproducing apparatus 41 described above is constructed to be slidable on the apparatus body, the structure may be arranged such that the tray can be a member separate from the apparatus body and an adaptor device is attached to the apparatus body.

Also, the recording/reproducing apparatus according to the present invention is not limited to a notebook computer but may be preferably applicable also to a digital camera, portable data viewer, portable music data reproducing device, and the like, each of which records and/or reproduces information onto and/or from a storage medium.

What is claimed is:

1. An adaptor device to which recording media having different shapes are attached and which is attached to an input/output device for performing input/output of a signal to/from the recording media, comprising:

attachment means to which the recording media are attached;

medium-side connection means electrically connected to terminal parts for signal input/output to/from the recording media;

device-side connection means electrically connected to a terminal part for signal input/output of the input/output device; and medium identification means by which the input/output device identifies a type of each of the recording media attached to the attachment means before the terminal part for input/output of the signal input/output device is electrically connected to the device-side connection means.

2. The adaptor device according to claim 1, wherein the medium identification means identifies the type of each of the recording media attached to the attachment means depending on a number of concave parts provided at a portion of the adaptor device.

3. The adaptor device according to claim 1, wherein the medium identification means identifies the type of each of the recording media attached to the attachment means depending on an arrangement of a plurality of concave parts provided at a portion of the adaptor device.

4. The adaptor device according to claim 1, wherein the medium identification means is provided at a front end side in an in/out direction with respect to the input/output device.

5. The adaptor device according to claim 1, wherein the medium identification means identifies the type of each of the recording media attached to the attachment means depending on a combination of members having a plurality of different reflection rates provided at a portion of the adaptor device.

6. An input/output device to which recording media respectively having different shapes are attached and which has an adaptor device including a medium-side connection part electrically connected to terminal parts of each of the recording media for signal input/output, a device-side connection part electrically connected to a terminal part for signal input/output of the input/output device, and a medium identification part for indicating a type of each of the recording media attached, comprising:

connection means electrically connected to the device-side connection part included in the adaptor device for performing input/output of a signal to/from the recording media; and determination means for determining a type of the recording media attached to the adaptor device based on a medium identification part provided on the adaptor device before the device-side connection part and the connection means are connected.

7. The input/output device according to claim 6, wherein the input/output device selects an access method for accessing the recording media attached to the adaptor device based on a determination result of the determination means before the device-side connection part and the connection means are connected.

8. An input/output device to which a plurality of recording media having different shapes are attached and which performs input/output of a signal to/from the plurality of recording media, comprising:

tray means having a plurality of attachment parts provided so that the plurality of attachment parts to which the plurality of recording media share respective partial attachment regions in one common projection plane on which the respective partial attachment regions are projected while having different attachment positions in a depth direction parallel to a thickness direction of the recording media;

a plurality of medium-side connection means respectively provided for the plurality of attachment parts and electrically connected to terminal parts for signal input/output to/from the plurality of recording media;

drive means for accessing the recording media through the plurality of medium-side connection means; and medium detection means for detecting a type of each of the plurality of recording media respectively attached to the plurality of attachment parts of the tray means before the drive means accesses the recording media.

9. The input/output device according to claim 8, wherein when a recording medium of the recording media is attached to the attachment parts, the tray means moves downward together with the recording medium to the attachment parts in a depth direction parallel to a thickness direction of the recording medium, and when the recording medium of the recording media is ejected from the attachment parts the tray means moves upward from the attachment parts.

10. The input/output device according to claim 8, wherein the tray means is provided to be slidable between a containing position wherein the tray means is contained in a device body of the input/output device and an ejected position wherein the tray means is ejected out of the device body.

11. The input/output device according to claim 8, wherein the tray means is provided with press means for maintaining a connection state in which the terminal parts for signal input/output of the recording media and the medium-side connection means are connected with each other by pressing the recording media attached to the attachment parts.

12. The input/output device according to claim 11, wherein the press means is provided to be open/closed with respect to the attachment parts of the tray means, and closes the tray means thereby pressing the recording media attached to the attachment parts against the attachment parts as the tray means is contained in the device body.

* * * * *